United States Patent [19]

Miller

[11] Patent Number: 4,480,462

[45] Date of Patent: Nov. 6, 1984

[54] HYDROSTATIC TEST APPARATUS

[75] Inventor: Darwin A. Miller, Houma, La.

[73] Assignee: Damco Testers, Inc., Houma, La.

[21] Appl. No.: 436,619

[22] Filed: Oct. 25, 1982

[51] Int. Cl.³ .............................................. G01M 3/02

[52] U.S. Cl. ...................................... 73/37; 73/40.5 R

[58] Field of Search ................ 73/37, 40, 40.5 R, 49.5

[56] References Cited

U.S. PATENT DOCUMENTS 2,696,730 12/1954 Justice ..................................... 73/40

2,924,971 2/1960 Schroeder et al. ...................... 73/37

3,577,768 5/1971 Aprill, Jr. et al. ............... 73/40.5 R 4,103,537 8/1978 Victor ............................. 73/40.5 R

*Primary Examiner*—Gerald Goldberg

*Assistant Examiner*—Hezron Williams

*Attorney, Agent, or Firm*—Fleit, Jacobson, Cohn & Price

[57] ABSTRACT

A portable hydrostatic test apparatus for pressure testing fluid system components. Hydraulic fluid is pressurized and serves as the pressure source for imposing a desired test pressure on a water filled system. The apparatus includes a pneumatically operated control valve to control a directional control valve in the hydraulic system. The several valves in the hydraulic system are mounted on and interconnected through an internally ported manifold to eliminate hoses.

5 Claims, 4 Drawing Figures

10
11
12
13
14
15
16
17
18
19
20
21
22
23
24
25
47

HYDROSTATIC TEST APPARATUS

BACKGROUND OF THE INVENTION

This invention relates to apparatus for imposing hydrostatic pressures upon fluid-carrying systems to determine their integrity and freedom from leaks. More particularly, the invention relates to a simplified hydrostatic test apparatus incorporating a hydraulic system to operate an actuator to impose a desired test pressure upon a fluid-carrying system by means of filling the system with water and imposing the desired test pressure upon the water filled system.

There are numerous instances where it is desired to determine the integrity and fluid tightness of a fluid-carrying system when the system is in a relatively remote area. In such instances portable pressure-generating systems are required, and such systems are known. See, for example, U.S. Pat. No. 3,810,383, which issued May 14, 1974 to Carrol J. Matherne, and which shows a mobile tubing testing unit having the several parts thereof secured to a frame which is readily movable from one place to another.

In addition to the ability to conduct pressure testing in remote locations, it is also desirable to provide a self-contained system which is capable of being connected to the fluid system in a secure and rapid manner and which does not require the use of water in the primary pressure system, in order to avoid the freezing problems which would occur during outdoor operation of such a system in cold environments. For an example of such a system utilizing hydraulic fluid as the principal pressurizing medium which, in turn, is used to pressurize a system which has been filled with water, see U.S. Pat. No. 3,151,478, which issued Oct. 6, 1964, to A. P. Heldenbrand. However, the system shown in that patent is not disclosed in the context of a readily portable system, and it also utilizes a pair of pressure transfer chambers which include a hydraulic oil-water interface wherein both fluids are present within the pressure transfer chamber at the same time. Thus, the applicability of the Heldenbrand system to an outdoor site in cold weather conditions is limited.

In addition to the portability and low temperature environment requirements, it is desirable that such a system not be unduly complicated by numerous valves, fittings, connecting lines, and the like. It is therefore an object of the present invention to provide a hydrostatic test system which is of a compact and portable construction.

It is another object of the present invention to provide an improved hydrostatic test system which utilizes fewer valves and connections than previously known systems in order to improve reliability.

It is still another object of the present invention to provide an improved hydrostatic test unit which is so configured as to facilitate replacement of the several valves thereof.

SUMMARY OF THE INVENTION

Briefly stated, in accordance with one aspect of the present invention, there is provided a hydrostatic test system including a frame, a self-contained hydraulic pressure generating system positioned on the frame, and including engine driven pump means for pressurizing a hydraulic fluid and valve means for selectively connecting said pump means to a hydrostatic pressurizing means in order to impose a desired pressure upon an element of a hydrostatic system connected to the pressurizing means. The system includes air operated control means to vary the position of a spring biased directional control valve in the hydraulic pressure generating system. The control means includes a source of pressurized air, a unitary, manually operated three position directional control valve connected to a speed control for the control for the engine and to one side of the directional control valve to energize the engine at either of two positions thereof and to operate the control valve at only one of the engine throttle energizing positions.

DESCRIPTION OF THE PREFERRED EMBODIMENTS

Figure 1:
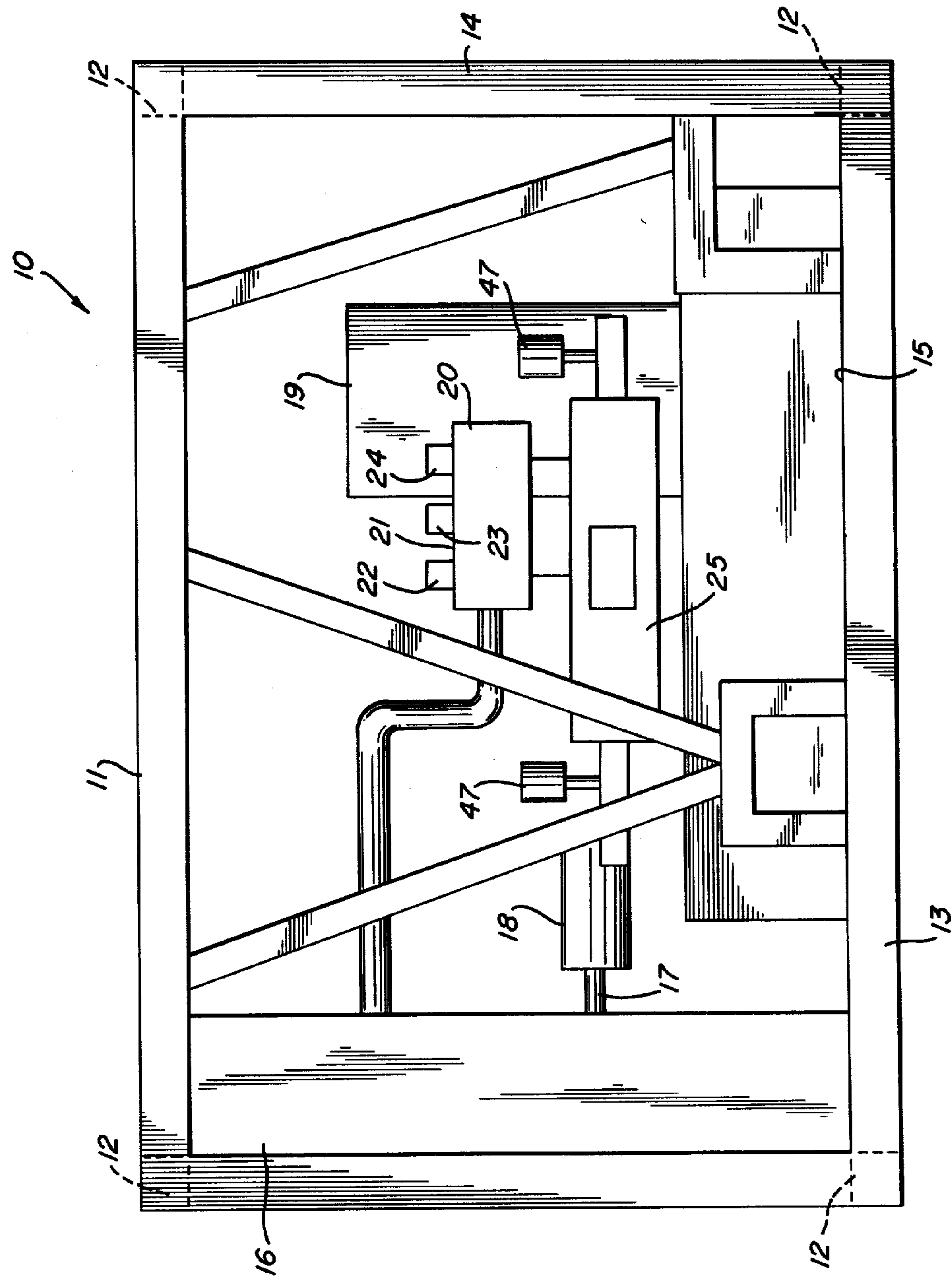
FIG. 1 is a side elevational view of a hydrostatic test apparatus in accordance with the present invention.
Figure 2:
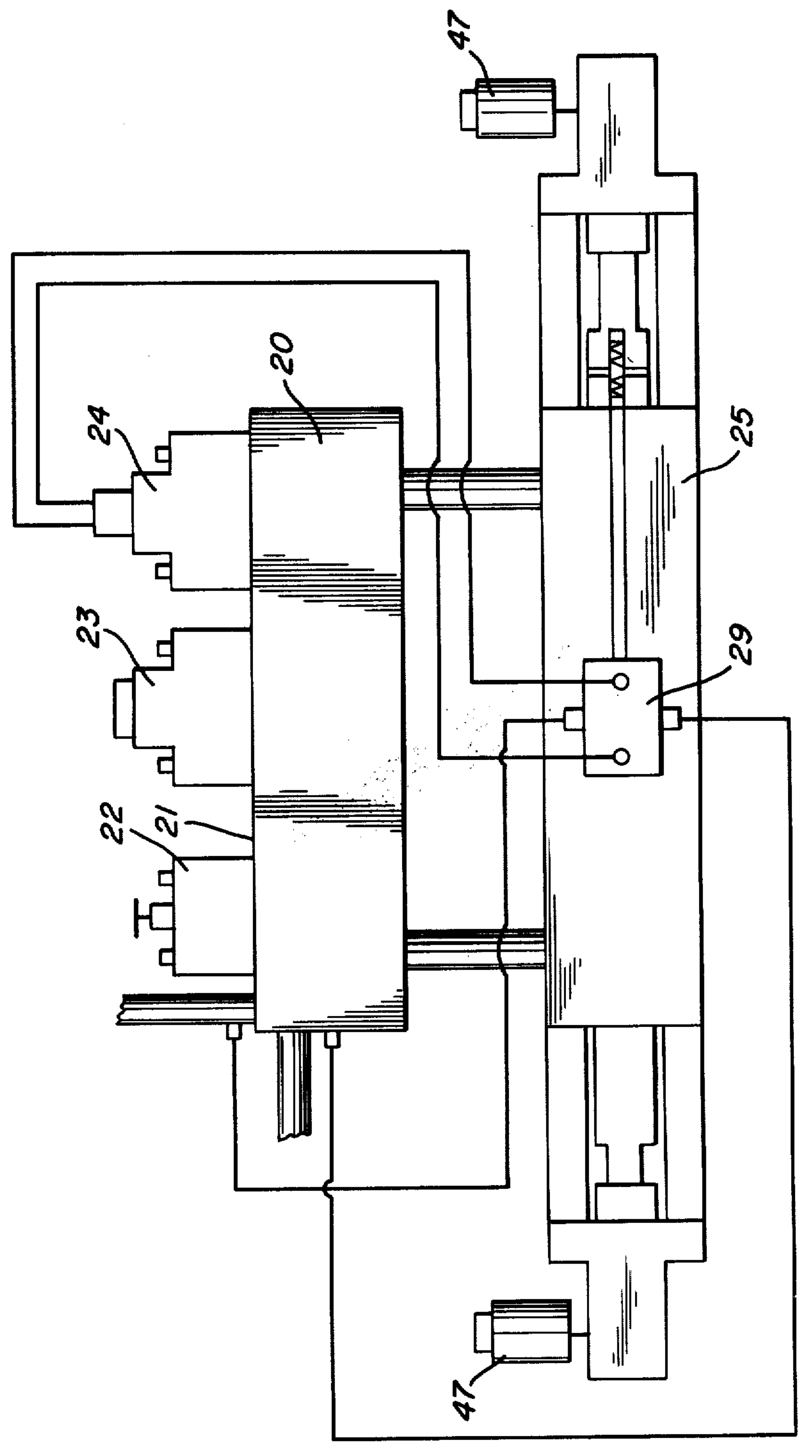
FIG. 2 is a schematic view of the hydraulic pressurizing system of a hydrostatic test apparatus in accordance with the present invention and showing the several parts thereof in their operative relationship.

Referring now to the drawings, and particularly the FIGS. 1 and 2 thereof, there is shown one form of hydrostatic test apparatus in accordance with the present invention. The apparatus includes a rigid frame 10, which is in the form of eight longitudinal and transversly-positioned main frame members in a generally rectangular array, only four of which, 11, 12, 13 and 14, are shown in FIG. 1. The frame members can be formed from tubes, angle members, channel members, I-beams, or the like. At the lower portion of frame 10 is a base 15 to which several of the principal parts of the system are secured. At one side of frame 10 there is positioned a hydraulic reservoir 16 to contain the hydraulic fluid utilized in connection with the pressurizing system of the present invention. Connected to the reservoir is a conduit 17 which is connected to the suction side of a suitable hydraulic pump 18, which, in turn, is driven through a power transmission (not shown) by a gasoline or diesel engine 19.

A manifold 20 is positioned on base 15 of frame 10 and includes an interiorly-positioned conduit arrangement, which will hereinafter be described in more detail. Positioned on the upper surface 21 of manifold 20 are three hydraulic valves, a hydraulic relief valve 22, a directional control ON-OFF valve 23, and a directional flow control valve 24, which together control the flow through the hydraulic system of the pressurized hydraulic fluid from the outlet side of the hydraulic pump. Also positioned on the base 15 of frame 10 is a linear hydraulic actuator 25 which serves to pressurize the hydrostatic test system. It can be seen that the number of parts and interconnections therebetween have been kept to a minimum to avoid leakage and to facilitate such maintenance as may become necessary.

Figure 3:
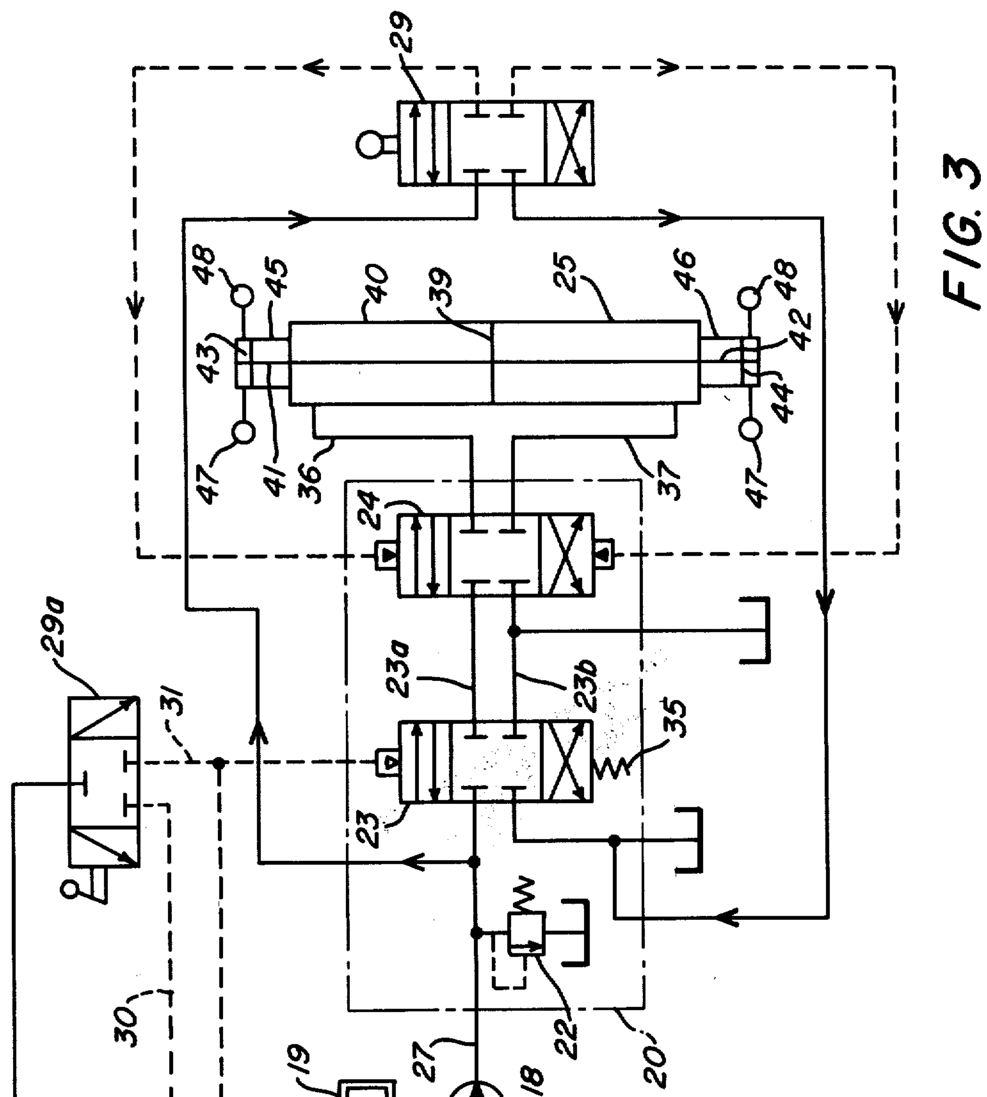
FIG. 3 is a circuit diagram of the hydraulic pressurizing system shown in FIG. 1.

Referring now to FIG. 3, there is shown the circuit diagram for the hydrostatic test system illustrated in FIGS. 1 and 2. As shown, hydraulic pump 18 has its suction side 26 connected to the hydraulic reservoir 16, and its outlet side 27 connected to manifold 20. Pump 18 is driven by engine 19 which, in turn, is regulated by means of an engine throttle cylinder 28, which, in turn, is controlled pneumatically. The pneumatic control system includes a source of pressurized air (not shown) which is connected to a manually-operated directional control valve 29*a*, which, as shown, can be a three position valve to provide communication between the pressure source and either or neither of the air pilot lines 30, 31. First air pilot line 30 extends to one side of an air shuttle check valve 32 and second air pilot line 31 extends to the other side of air shuttle check valve 32. The air, which can enter check valve 32 from either side, is conveyed to engine throttle cylinder 28 by means of a suitable conduit 33. In addition, second air pilot line 31 is connected to one side of air actuated directional control valve 23.

Outlet 27 of hydraulic pump 18 is connected to one side of air actuated directional control valve 23 and includes a connection to reservoir 16 through pressure reducing and relief valve 22, which can be set at any desired pressure to protect the hydraulic system from an overpressure condition, and which can be a two position, spring biased relief valve as shown. Air actuated directional control valve 23 can be a four way, pilot operated, three position, four ported valve which includes a biasing means in the form of a return spring 35, which is intended to bias the valve to the off position shown in FIG. 3 until the biasing force is overcome by the air pressure in pilot line 31. When control valve 23 is open it permits flow of hydraulic fluid to take place through conduit 23*a* and to permit return flow to take place through conduit 23*b*.

Directional flow control valve 24 is positioned downstream of control valve 23 and is hydraulically actuated through a manually-controlled hydraulic directional control valve 29 in order to permit the flow to occur in such a direction as to cause hydraulic pressure to be exerted in either of inlet lines 36 or 37 of hydraulic actuator 25, which is connected thereto, and which includes a substantially centrally-positioned, double acting piston 39 slidably received within a cylinder 40. Piston 39 includes rod members 41, 42 which extend from either side thereof and which terminate in smaller-diameter pistons 43, 44, respectively, which are slidably received in correspondingly smaller cylinders 45, 46, respectively, positioned at opposite ends of cylinder 40.

Directional control valve 29 is a three position valve which permits flow through a conduit connected with the discharge of hydraulic pump 18 through either of a pair of conduits 23*a*, 23*b*, each of which is interconnected to each of directional control valve 23 and 24. Thus, by manually positioning directional hydraulic control valve 29, hydraulically-actuated directional control valve 24 can be properly positioned.

Figure 4:
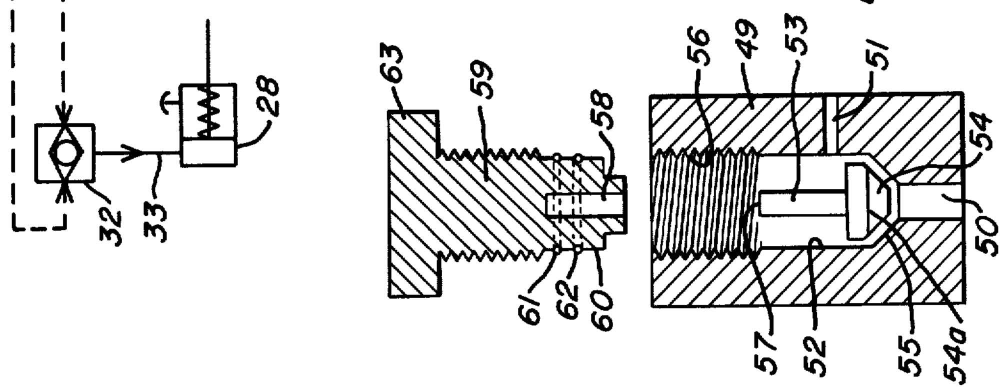
FIG. 4 is a cross-sectional view of one form of check valve which can be utilized in connection with the hydrostatic test system illustrated in FIGS. 1 and 2.

Connected to the smaller piston-cylinder arrangements 45, 46, which are sometimes referred to as hydrostatic pressure intensifiers, are a pair of hydrostatic suction check valves 47 and a pair of hydrostatic discharge check valves 48. The construction of each of the hydrostatic suction and discharge check valves is shown most clearly in FIG. 4. As therein shown, each check valve includes a body 49 which can be of cylindrical form, and which includes a pair of perpendicularly-oriented conduits, an inlet conduit 50 and an outlet conduit 51, each of which extends generally to a cylindrical central flow channel 52. Positioned within flow channel 52 is a valve member 53 which has a generally conical closure element 54 cooperatively received in a correspondingly-shaped conical transition section 55 between inlet conduit 50 and central flow channel 52. An 0-ring 54*a* is provided in closure element 54 to prevent leakage therearound when the closure element is seated in transition section 55. Extending upwardly from conical transition section 55 and central flow channel 52 is an internally threaded cylindrical bore 56 which at its uppermost end terminates in an opening at the opposite end of body 49 from conduit 50.

Valve member 53 includes an upwardly extending cylindrical rod 57 which is slidably received within a corresponding cylindrical opening 58 formed in a plug member 59, which also includes a cylindrical pilot 60 configured to be slidably received within cylindrical central flow channel 52. Positioned around the periphery of plug member 59 are a pair of spaced O-rings 61, 62 which serve to prevent flow leakage from valve member 53 through central flow channel 52. Plug member 59 can also include an outlet flange 63 to limit the inward travel thereof into check valve body 49.

In operation, engine 19 is actuated by moving air directional control valve 29*a* into one or the other of its extreme positions to permit control air to flow therethrough, through one of air pilot lines 30, 31 to shuttle check valve 32, and thence to engine throttle cylinder 28. Engine 19, which is controlled through engine throttle cylinder 28, drives hydraulic pump 18 to pump hydraulic fluid from reservoir 16 to manifold 20. Within manifold 20, the hydraulic fluid passes through an internal passageway to pressure reducing and relief valve 22, and, unless the pressure is sufficiently high to activate the valve, in which case the fluid would be diverted back to reservoir 16, the fluid then flows through conduit 27 to air actuated directional control valve 23, and simultaneously to hydraulic directional control valve 29.

Air actuated directional control valve 23 serves as an ON-OFF valve and is spring biased into a first OFF position, as shown, and, depending upon the position of air directional control valve 29*a* in the control air system, when directional control valve 23 is in the ON position to permit flow of hydraulic fluid therethrough, the outlet flow therefrom will pass through conduit 23*a* to directional control valve 24.

Depending upon the position of manually operated hydraulic directional control valve 29, hydraulically actuated directional control valve 24 will be urged to one or the other of its extreme positions to thereby influence which side of actuator 25 will be provided with pressurized hydraulic fluid. When actuated, piston 39 will move in one axial direction or the other to operate the hydrostatic intensifiers at either end thereof, which, in turn, operate on a water system (not shown) to provide the increased pressure which is utilized to effect the test pressure whereby the presence or absence of leakage is determined.

Thus, it can be seen that the present invention provides an improved hydrostatic test apparatus in that fewer hydraulic valves are utilized and the interconnections between those valves which form a part of the system are contained within a unitary manifold to which the valves are bolted, thereby eliminating the need for rigid or flexible tubing interconnections, which are prone to leakage and which are subject to damage under the rough handling conditions to which such apparatus is subjected in the field.

While particular embodiments of the present invention have been illustrated and described, it will be apparent to those skilled in the art that various changes and modifications can be made without departing from the spirit and scope of the present invention, and it is intended to cover in the appended claims all such changes and modifications which fall within the scope of the present invention.

What is claimed is:

1. A portable hydrostatic test system comprising: a frame, a self-contained hydraulic pressure generating system positioned on the frame and including engine driven pump means for pressurizing a hydraulic fluid, valve means for selectively connecting said pump means to a hydrostatic pressurizing means to impose a desired pressure upon an element of a hydrostatic system connected to said pressurizing means, pneumatically operated control means to vary the position of a spring biased directional control valve in said hydraulic pressure generating system, said control means including a unitary, manually operated, three position directional control valve pneumatically connected to speed control means for an engine to drive said pump and pneumatically connected to one side of said spring biased directional control valve, said manually operated directional control valve being operable to control said engine at either of two positions of said manually operated direction control valve and to operate said spring biased directional control valve at only one position of said manually operated directional control valve.

2. The hydrostatic test system of claim 1 wherein said hydraulic pressure generating system includes a pressure manifold having internal conduits extending between a pressure relief valve, an air actuated directional control valve, and a hydraulically actuated directional control valve.

3. The hydrostatic test system of claim 2 wherein said valves in said hydraulic pressure generating system are externally mounted on said manifold.

4. The hydrostatic test system of claim 3 wherein said valves in said hydraulic pressure generating system include inlet and outlet ports in communication with said internal conduits.

5. The hydrostatic test system of claim 1 including check valve means positioned in said hydrostatic pressurizing means, said check valve means including a movable valve element slidably carried in a plug member, said plug member including a cylindrical portion adjacent said valve member and carrying sealing means cooperable with a corresponding cylindrical flow channel to limit flow through said valve from an inlet port to an outlet port.

* * * * *